United States Patent
Koch

[11] Patent Number: 5,153,008
[45] Date of Patent: Oct. 6, 1992

[54] EXTRUSION WELDER

[75] Inventor: Heinrich Koch, Siegburg, Fed. Rep. of Germany

[73] Assignee: Heinrich Koch Plastmaschinen GmbH & Co. KG, Siegburg, Fed. Rep. of Germany

[21] Appl. No.: 764,056

[22] Filed: Sep. 23, 1991

Related U.S. Application Data

[63] Continuation of Ser. No. 421,637, Oct. 16, 1989, abandoned.

[30] Foreign Application Priority Data

Oct. 15, 1988 [DE] Fed. Rep. of Germany ....... 3835250

[51] Int. Cl.$^5$ ............................................. B29C 65/40
[52] U.S. Cl. .................................. 425/202; 222/146.5; 222/240; 366/76; 366/183; 425/207; 425/209
[58] Field of Search ................. 366/76, 150, 183, 89, 366/99, 323; 222/146.5, 146.6, 240, 241, 242; 264/138; 425/200, 202, 207, 208, 209, 305.1, 87, 458

[56] References Cited

U.S. PATENT DOCUMENTS

| | | | |
|---|---|---|---|
| 3,743,252 | 7/1973 | Schott, Jr. ............... | 259/191 |
| 3,945,535 | 3/1976 | Leiste et al. ............ | 222/146.5 |
| 4,561,569 | 12/1985 | Dziki ........................ | 222/146.5 |
| 4,695,240 | 9/1987 | Li et al. .................... | 222/146.5 |
| 4,848,915 | 7/1989 | Fintel ...................... | 366/76 |

FOREIGN PATENT DOCUMENTS

| | | |
|---|---|---|
| 0100945 | 2/1984 | European Pat. Off. . |
| 0131056 | 1/1985 | European Pat. Off. . |
| 840596 | 10/1951 | Fed. Rep. of Germany . |
| 899386 | 3/1953 | Fed. Rep. of Germany . |
| 2142689 | 3/1972 | Fed. Rep. of Germany . |
| 2351328 | 4/1975 | Fed. Rep. of Germany . |
| 2823171 | 11/1979 | Fed. Rep. of Germany . |
| 3221492 | 2/1984 | Fed. Rep. of Germany . |
| 8612130 | 9/1986 | Fed. Rep. of Germany . |
| 3808723 | 6/1989 | Fed. Rep. of Germany . |
| 2399311 | 3/1979 | France . |
| 628570 | 3/1982 | Switzerland . |

Primary Examiner—Jay H. Woo
Assistant Examiner—Khanh P. Nguyen
Attorney, Agent, or Firm—Anderson Kill Olick & Oshinsky

[57] ABSTRACT

The invention is directed to an extruder 1, particularly a small extruder for transferring plastics material in strand form to a plasticized state. In order to improve the homogeneity, it is provided that the screw portion 7 serving for drawing in be constructed simultaneously for granulating the plastics material which is then melted in the further plasticizing portion 6. The special arrangement of the draw-in channel 12 in relation to the configuration of the screw profile of the granulating screw portion 7 causes the separation and granulation of the drawn in plastics strand, so that material which is already granulated is fed into the plasticizing screw portion 6 projecting into the cylindrical bore hole 10 of the housing portion 9 and can then be transferred into the desired state along a short distance.

6 Claims, 1 Drawing Sheet

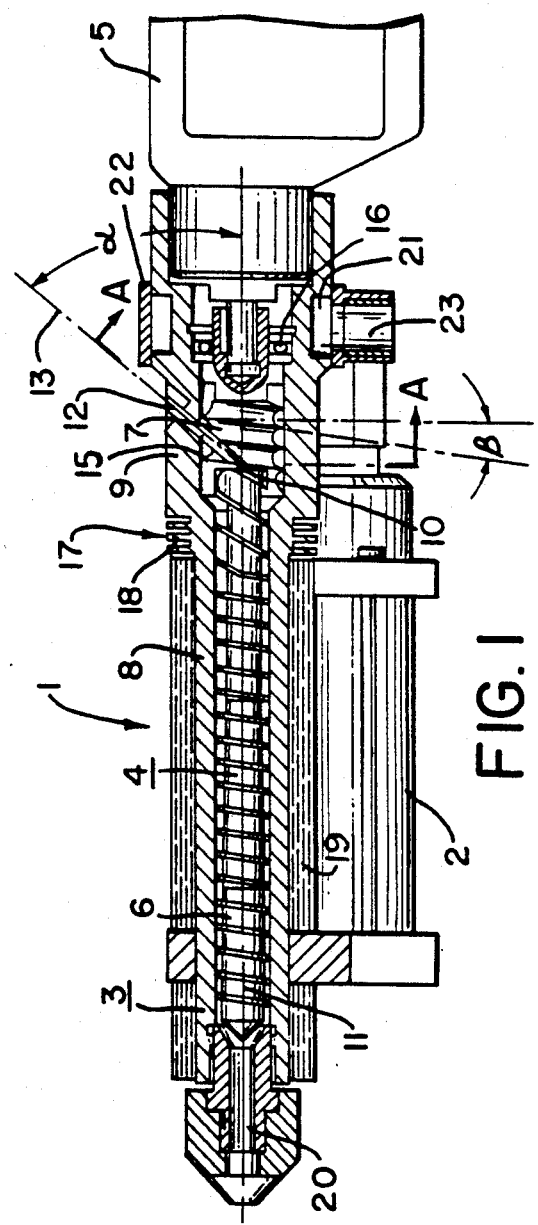
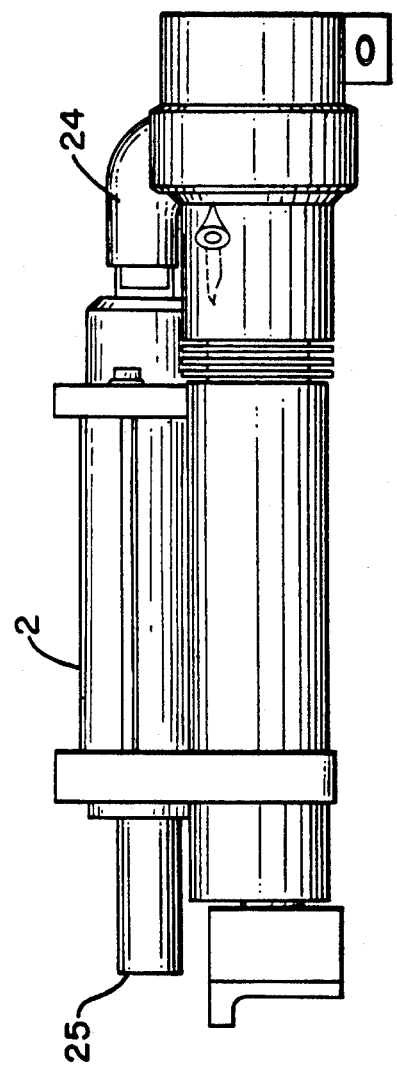
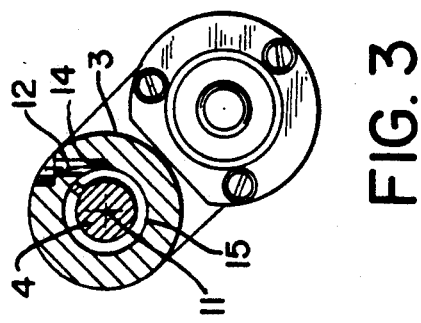

EXTRUSION WELDER

This is a continuation application of Ser. No. 07/21,637, filed Oct. 16, 1989 now abandoned.

BACKGROUND OF THE INVENTION

1. Field of the Invention

The invention is directed to a welding extruder for plasticizing thermoplastic plastics material in strand form, particularly in the form of round wire, wherein the screw arranged in the housing comprises two portions, the shorter portion being constructed for drawing in the plastics material and the longer portion, which is heatable along at least a part of its length, being constructed for plasticizing, and which screw is drivable via a coaxial drive, wherein a draw-in channel is arranged in the housing in the area of the shorter screw portion for feeding the plastics material.

DESCRIPTION OF THE RELATED ART:

It is generally known in extruders to construct the screw in a plurality of parts, i.e. to let them have a plurality of portions, one of them being constructed e.g. as plasticizing screw portion and the other as draw-in portion. A draw-in channel opens into the area of the draw-in portion, the plastics material to be processed, which can be in the form of strands, e.g. in the form of ribbons, being introduced and drawn in through the draw-in channel. It is known to construct this draw-in screw portion e.g. cylindrically or conically. The screw comprising the two portions is driven by means of a drive which is preferably arranged coaxially. As a rule, the screw itself is supported on the drive side at an axial bearing. It is also known to use such extruders for melting or plasticizing plastics welding material. In this case, the extruders are constructed so as to be correspondingly small without changing anything, in principle, in the operation of the extruder operation. In such a known extruder (DE-PS 32 21 492) for plasticizing plastics material which is deposited in a welding joint, it is known to provide a thickness compensating slide for adapting to various material thickness of the fed in plastics material. The screw portion assigned to the draw-in channel is only constructed as a draw-in portion, i.e. the material is first reduced and then plasticized in the adjoining screw portion which is constructed as a conveying and reducing member and forms the longer screw portion. The draw-in portion is constructed only as a feed screw.

It has been shown that the melting of the material is not effected in an optimal manner in smaller extruders with such a construction. In particular, a homogenous plasticized strand exiting from the nozzle is not produced. Irregularities cause a reduction in quality of the melted or plasticized material, among other things. When this material is intended for connecting other thermoplastic plastics elements, that is, for connecting by means of welding, a reduction in the quality of the welding seam is achieved.

Proceeding from this, the invention has the object of providing a high-speed extruder in which an improved plasticizing is ensured also with a short overall length of the screw and an extensively homogeneous plasticized strand can be produced.

This object is met, according to the invention, in that the shorter screw portion is constructed as a drawing in, granulating screw portion, in that at least one draw-in channel is provided which is constructed as a bore hole in the housing, whose axis extends in the direction of the plasticizing screw portion, as seen in the longitudinal section of the housing, so as to intersect the screw axis and the profile of the granulating screw portion, and in that the bore hole forming the draw-in channel intersects the cylindrical bore hole of the housing portion receiving the granulating screw portion.

This construction has the advantage that at least a preliminary granulation is effected already in the area serving to draw in the plastics material to be plasticized, so that in the adjoining plasticizing screw portion the entire length is available for the melting of the plastics material. Accordingly, it is ensured that extremely short overall lengths are also achieved for the screw and accordingly for the extruder. This benefits use in portable devices which serve for preparing a plastics strand for depositing in a welding joint.

The provided rigid draw-in channel effects a direct advancing of the plastics strand to the granulating screw portion and, beyond this, the inclined arrangement causes the granulating process to be carried out along the shortest path.

In a further construction, it is provided that the wall of the draw-in channel approximates the outer contour of the granulating screw portion in the direction of the plasticizing screw portion.

Because of this step, there is no risk of a tearing of the strand in any operating state, rather a drawing in and a granulation occur in a continuous manner.

A particularly advantageous granulation behavior results when the threads of the granulating screw portion are constructed so as to be shaped in a saw-tooth manner in cross section.

It is provided, in addition, that the granulating screw portion comprises a cylindrical outer contour whose outer diameter is greater than that of the cylindrical plasticizing screw portion, and that the plasticizing screw portion projects axially into the housing portion receiving the granulating screw portion and comprising the cylindrical bore hole.

This construction ensures a reliable and continuous transfer of the granulated material into the plasticizing screw portion.

In order to achieve a clear separation between the operations of the two screw portions it is provided to arrange a cooling portion between the heatable housing portion receiving the plasticizing screw portion and the housing portion comprising the cylindrical bore hole for the granulating portion.

It is accordingly ensured that no plasticizing which would impede the feeding of the material takes place in the area of the drawing in, since this could cause a certain softening, for example.

The cooling portion preferably comprises cooling ribs. The latter are cut into the outer contour of the housing for example.

For extruders with a higher output, it is suggested, in addition, that two circumferentially offset draw-in channels be provided. In welding extruders with higher output, chips are usually used as starting material. The supply container required for this makes the device so heavy that it is no longer manageable. Particularly favorable cutting conditions and granulating results are achieved when the pitch angle is 3 to 8 degrees and the angle of inclination is 45 to 5 degrees.

A preferred embodiment example of the invention is shown schematically in the drawing and explained with the aid of the latter.

BRIEF DESCRIPTION OF THE DRAWINGS:

FIG. 1 shows a longitudinal section through the extruder, according to the invention, with an additional hot-air unit;

FIG. 2 shows a top view of FIG. 1 and;

FIG. 3 shows a section A—A according to FIG. 1, wherein the draw-in channel is folded in in the drawing plane.

The extruder 1 shown in the drawing is to be used for preparing, i.e. for plasticizing, plastics material in strand form e.g. in the form of plastic round wire, wherein a molten strand, which is to be used e.g. for producing a welding joint between corresponding thermoplastic plastics materials, exits from the nozzle 20 of the extruder 1, wherein the welding joint itself is prepared by means of the air exiting from the hot-air unit 2 for achieving the connection. Thus, this is a high-speed small extruder.

The teaching of the invention can also be transferred to extruders with higher output.

First, the extruder 1 itself is described in more detail. The extruder 1 comprises the housing 3 and the screw 4 which is supported against an axial bearing 16 on the drive side. The screw 4 is driven in rotation via a drive 5 which can be formed e.g. by a drilling machine.

The screw 4 is constructed in portions. It comprises a plasticizing screw portion 6 in which the material is melted and a granulating screw portion 7 in which the fed material is reduced.

The screw 4 is received in corresponding portions 8, 9 of the housing 3. Thus, for example, the granulating screw portion 7 is constructed with a larger diameter and received in a corresponding cylindrical bore hole 10 of the housing 3 and the housing portion 9. The plasticizing screw portion 6 comprises a smaller outer diameter than the granulating screw portion 7. It is likewise cylindrical on the outside and received in a correspondingly cylindrical bore hole of the housing portion 8. It can be seen from FIG. 1 that the plasticizing screw portion 6 projects into the cylindrical bore hole 10 for the granulating screw portion 7. The plastics material to be granulated and plasticized is introduced into the area of the granulating screw portion 7 via a draw-in channel 12 which is constructed as a bore hole. The latter can be seen from FIGS. 1 and 3. It is arranged so as to extend at an inclination relative to the screw axis 11 and the angle of inclination of the bore hole axis 13 is designated by $\alpha$. As can be seen from FIG. 3, the wall 14 of the draw-in channel 12 approximates the outer contour 15 of the granulating screw portion 7. This approximation is effected in the direction of the plasticizing screw portion 6. The angle of inclination is selected in such a way that the bore hole axis 13 of the draw-in channel 12 intersects the screw contour of the granulating screw portion 7. For this reason, the angle of inclination for the bore hole axis 13 of the draw-in channel 12 and the pitch angle $\beta$ for the screw profile of the granulating screw portion 7 have a determined reciprocal action in order to constantly ensure the aforementioned relationships. Particularly advantageous cutting and granulating conditions result when the screw profile of the granulating screw portion 7 is constructed in a saw-tooth shape, wherein the steeper flank is directed to the plasticizing screw portion 6.

In order to prevent a premature tearing of the introduced plastics strand, a transition is provided in the housing portion 9 between the draw-in channel 12 and the cylindrical bore hole 10, which ensures that the free cross section between the outer contour 15 of the granulating screw portion 7 and the draw-in channel 12 decreases. For this reason, the wall 14 of the draw-in channel 12 approximates the outer contour 15 of the granulating screw portion 7 as it continues to approach the plasticizing screw portion 6. At least one portion of the housing portion 8 receiving the plasticizing screw portion 6 is constructed so as to be heatable. For this purpose, the housing portion 8 is enclosed by a heater 19. The heater 19 serves particularly to ensure continuous melting conditions. Thus, the measurement of the current temperatures can serve for controlling the heating as well as for controlling the drive 5. For example, the drive 5 can be coupled with the heating control in such a way that the drive 5 can not be actuated and, accordingly, the screw 4 can also not be rotated when the desired plasticizing temperature has not yet been reached.

In order to prevent a temperature exchange occurring between the two housing portions 8 and 9, a cooling portion 17 is provided between these two housing portions 8 and 9. The cooling portion 17 is substantially formed by means of cooling ribs 18 which are cut into the outer contour of the housing 3. This also prevents a heating of the housing portion 9 to the extent that a pre-heating of the introduced plastics material occurs due to a temperature exchange, which would impede a clean granulation of the plastics strand in the area of the granulating screw portion 7.

The hot-air unit 2 is constructed as a cartridge heater by means of which an air flow, which is produced by means of an external fan, is conducted through via tube and pipe lines. This externally produced fan air flow can be used moreover for cooling the housing portion 9 receiving the granulating screw portion 7. Thus, it can be seen from FIGS. 1 and 2, for example, that an annular duct 21 is provided in the housing portion 9 and specifically in the area of the axial bearing 16, which annular duct 21 is cut into the housing portion 9 as a recess and closed by means of a cover ring 22. The cover ring 22 comprises a connecting sleeve with a feed air opening 23 with which e.g. a tube, which is connected with the external fan, can be connected. The air is fed via the tube into the feed air opening 23, the annular duct 21 and the feed air line 24 to the hot-air unit 2, which feed line 24 is connected with the annular duct 21.

The hot-air unit 2 is provided with a flow-out nozzle 25 which reaches approximately up to the area of the nozzle 20 of the extruder 1 and serves to guide the hot air to the prepared welding joint in order to melt the material in the area of the welding joint in which the material strand exiting from the nozzle 20 can be deposited.

Extruder 1 extruder
2 hot-air unit
3 housing
4 screw
5 drive
6 plasticizing screw portion
7 granulating screw
8, 9 housing portion 10 cylindrical bore hole
11 screw axis
12 draw-in channel/bore hole
13 bore hole axis
14 wall of the draw-in channel
15 outer contour of the granulating screw portion
16 axial bearing
17 cooling portion
18 cooling ribs
19 heater
20 nozzle
21 annular duct
22 cover ring
23 feed air opening
24 feed air pipe
25 flow out nozzle
β pitch angle
α angle of inclination

I claim:

1. A welding extruder for plasticizing thermal plastic material in a strand form, comprising:
   a housing (3);
   a screw (4) arranged in the housing (3) and having a longitudinal axis (11), a shorter draw-in and granulating screw portion (7) for drawing in and granulating the plastic material, and a longer plasticizing screw portion (6) that is heatable along at least a part of its length, the granulating screw portion (7) having threads with a saw-toothed cross-section with a steeply extending flank of the saw-toothed cross-section directed towards the plasticizing screw portion (6) so that the strand of plastic material is continuously drawn in and granulated without tearing the strand;
   a coaxial drive for driving the screw (4); and
   at least one draw-in channel (12) provided in the housing (3) as a bore hold near the shorter granulating screw portion (7) so as to permit feeding of the plastic material in strand form, the draw-in channel (12) having a longitudinal axis (13) that extends toward the plasticizing screw portion (6) so as to intersect a horizontal axis parallel to the screw axis (11), and tangential to a cylindrical outer contour (15) of the granulating screw portion (7) so that the draw-in channel (12) is inclined in the direction of the plasticizing screw portion (6) and extends so as to gradually approach the contour (15), the cylindrical outer contour (15) having an outer diameter that is greater than that of the cylindrical plasticizing screw portion (6) of the screw (4).

2. Extruder according to claim 1, wherein the granulating screw portion (7) comprises a cylindrical outer contour (15) whose outer diameter is greater than that of the cylindrical plasticizing screw portion (6), and the plasticizing screw portion (6) project axially into the housing portion (9) receiving the granulating screw portion (7) and comprising the cylindrical bore hole (10).

3. Extruder according to claim 1 or 2, wherein a cooling portion (17) is arranged between a heatable housing portion (8) receiving the plasticizing screw portion (6) and the housing portion (9) comprising the cylindrical bore hole (10) for the granulating screw portion (7).

4. Extruder according to claim 3 wherein the cooling portion (17) comprises cooling ribs (18).

5. Extruder according to claim 1, wherein two circumferentially offset draw-in channels(12) are provided.

6. Extruder according to claim 1, wherein the granulating screw portion has a pitch (β) of 3-9 degrees, and an angle (α) of inclination of 45 to 55 degrees is formed by intersection of the axis of the draw-in channel and the screw axis.

* * * * *